United States Patent
Kaesbauer et al.

(10) Patent No.: US 11,444,391 B2
(45) Date of Patent: Sep. 13, 2022

(54) ELECTRICAL CONTACTING INTERFACE WITH A LOW AND STABLE ELECTRICAL TRANSFER RESISTANCE

(71) Applicant: Siemens Aktiengesellschaft, Munich (DE)

(72) Inventors: Peter Kaesbauer, Schwandorf (DE); Norbert Reichenbach, Amberg (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 16/765,265

(22) PCT Filed: Nov. 14, 2018

(86) PCT No.: PCT/EP2018/081155
§ 371 (c)(1),
(2) Date: May 19, 2020

(87) PCT Pub. No.: WO2019/101588
PCT Pub. Date: May 31, 2019

(65) Prior Publication Data
US 2020/0373687 A1     Nov. 26, 2020

(30) Foreign Application Priority Data

Nov. 24, 2017   (DE) ..................... 10 2017 221 071.0

(51) Int. Cl.
*H01R 4/02*   (2006.01)
*H01R 4/26*   (2006.01)
(Continued)

(52) U.S. Cl.
CPC .............. *H01R 4/26* (2013.01); *H01R 4/304* (2013.01); *H01R 4/62* (2013.01); *H02B 1/20* (2013.01)

(58) Field of Classification Search
CPC .............................. H01R 4/02; H01R 13/2457
See application file for complete search history.

(56) References Cited

U.S. PATENT DOCUMENTS

| 4,943,247 A | * | 7/1990 | Wise | ........................ H01R 4/34 439/883 |
| 6,082,942 A | | 7/2000 | Swick | |

(Continued)

FOREIGN PATENT DOCUMENTS

| CN | 103715524 A | 4/2014 |
| DE | 2156292 A1 | 5/1973 |

(Continued)

OTHER PUBLICATIONS

PCT International Search Report dated Feb. 21, 2019 corresponding to PCT International Application No. PCT/EP2018/081155 filed Nov. 14, 2018.

(Continued)

*Primary Examiner* — Chau N Nguyen
(74) *Attorney, Agent, or Firm* — Harness, Dickey & Pierce, P.L.C.

(57) ABSTRACT

An electrical contacting interface includes a low and stable electrical transition resistance including at least two contacting partners, which interact for electrical contacting. According to an embodiment, in one of the two contacting partners, in the region of a contacting surface, a structure is formed which protrudes from the plane of the contacting surface of the one contacting partner. The structure deforms under the influence of a mechanical force and causes a corresponding deformation in the shape of a recess in the opposite contacting partner. The structure protruding from the plane is formed such that even after the deformation caused in the opposite contacting partner and the flat regions of the two contacting surfaces do not touch. Therefore, the electrical current is forced to flow solely through the contact (Continued)

interface created during the deformation process, such that the electricity transfer surfaces are precisely localized.

12 Claims, 3 Drawing Sheets

(51) Int. Cl.
*H01R 4/30* (2006.01)
*H01R 4/62* (2006.01)
*H02B 1/20* (2006.01)

(56) References Cited

U.S. PATENT DOCUMENTS

| | | | | |
|---|---|---|---|---|
| 6,654,995 | B1 * | 12/2003 | Wang | B21D 39/04 |
| | | | | 219/93 |
| 6,939,097 | B2 * | 9/2005 | Carr | F16B 43/00 |
| | | | | 411/155 |
| 10,453,587 | B2 * | 10/2019 | Wakamori | B23K 11/14 |
| 2016/0149328 | A1 | 5/2016 | Tomine et al. | |
| 2016/0181707 | A1 | 6/2016 | McConkey | |
| 2016/0226158 | A1 * | 8/2016 | Cox | H01R 4/305 |

FOREIGN PATENT DOCUMENTS

| | | |
|---|---|---|
| DE | 102008061186 A1 | 6/2010 |
| DE | 102013208242 A1 | 11/2014 |
| DE | 112014003123 T5 | 3/2016 |
| DE | 102014225419 A1 | 6/2016 |
| DE | 102015216380 A1 | 3/2017 |
| EP | 0516984 A1 | 12/1992 |
| EP | 2230705 A1 | 9/2010 |
| GB | 1047764 A | 11/1966 |
| WO | WO 2015052955 A1 | 4/2015 |
| WO | WO 2017/110064 * | 6/2017 |

OTHER PUBLICATIONS

Written Opinion of International Searching Authority dated Feb. 21, 2019 corresponding to PCT International Application No. PCT/EP2018/081155 filed Nov. 14, 2018.

CA Office Action for European Patent Application No. 18810899.7 dated Oct. 18, 2021.

* cited by examiner

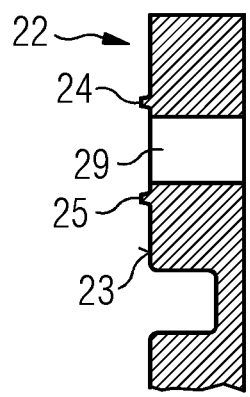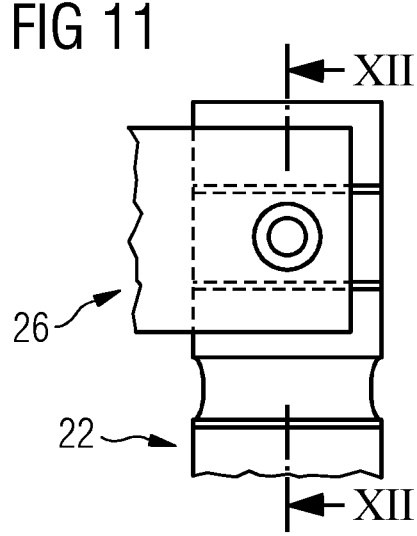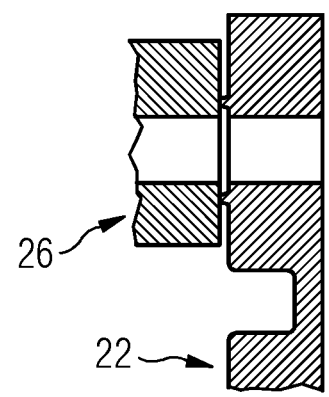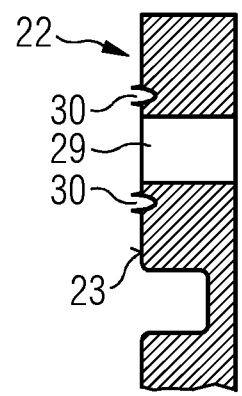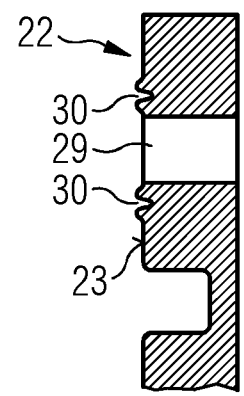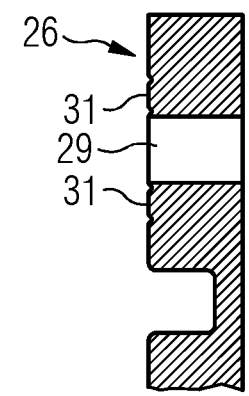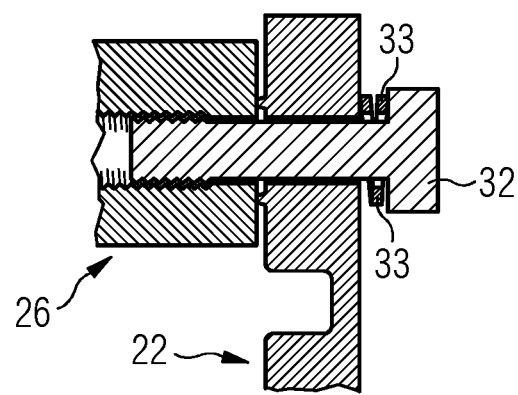

ELECTRICAL CONTACTING INTERFACE WITH A LOW AND STABLE ELECTRICAL TRANSFER RESISTANCE

PRIORITY STATEMENT

This application is the national phase under 35 U.S.C. § 371 of PCT International Application No. PCT/EP2018/081155 which has an International filing date of Nov. 14, 2018, which designated the United States of America and which claims priority to German patent application no. DE 102017221071.0 filed Nov. 24, 2017, the entire contents of each of which are hereby incorporated herein by reference.

FIELD

Embodiments of the invention generally relate to an electrical contacting interface with a low and stable electrical transfer resistance comprising at least two contacting components, which interact for electrical contacting.

BACKGROUND

For conducting and distributing electrical current, electrical contacting components are used. This very often requires that different current conductors have to be connected to one another. These connecting points have to be configured such that the electrical voltage drop across the connecting point remains as low as possible throughout the period of use. This avoids overheating of the connecting point, which could damage the electrical insulation of the current conductors to be connected or else, if the connecting point lies within an electrical device, impair its function, damage or destroy it.

A low voltage drop also ensures energy-saving distribution and conduction of the current. In devices for controlling and influencing the electrical current, there may be several connecting points. Examples of such devices may be for instance mechanical switchgear that switches the current on and off or else electronic switchgear, such as for instance soft starters for controlling asynchronous machines. Similarly, however, they may also be converters or inverters that produce a three-phase system of variable frequency and voltage for suitably operating motors.

Connecting points must furthermore also be of such a nature that, with the combinations of conductor materials and surface coatings occurring, they ensure a permanently good electrical connection.

FIG. 1 shows as an example of different connecting points a power module 1 with a mechanical contact system comprising two fixed contact pieces 2, 3 and a bridge 4, as are used in soft starting devices. These soft starting devices are designed for operating asynchronous machines in three-phase power supply systems and contain three of these subassemblies shown in FIG. 1. The connection of the devices to the three-phase system takes place by way of the respective terminal bars 5 and 6.

In the power module 1, two thyristors are arranged anti-parallel. With the thyristors, the current is controlled by suitable activation in order to obtain soft starting or braking of the ASM. The electrical losses thereby produced in the thyristors are carried away from them by aluminum heat sinks 7, 8, 9, to avoid them overheating. The two thyristors are located between the upper heat sink 7 and the two lower heat sinks 8, 9 and cannot be seen here.

After starting, the ASM is in steady-state operation. To avoid electrical losses in the thyristors in this operating state, they are bridged by the mechanical contact system. This consists of the fixed contact pieces 2 and 3 and also the movable bridge 4, which in the bridged state lies on the two fixed contact pieces 2, 3 and connects them to one another in a conducting manner. If the ASM is to be controlled by means of the thyristors, the bridge 4 is moved upward by a drive system not shown here, and so the fixed contact pieces 2, 3 are no longer connected. The bridging of the thyristors is then terminated.

There are consequently two current paths, depending on the operating state. The "thyristor control" current path consists of the copper terminal bar 6, the connecting point 10, the aluminum connector 11, the connecting point 12 (not visible here), the heat sink 7, the thyristors, the heat sinks 8, 9, the connecting point 13, the aluminum connector 14, the connecting points 15, 16 and the copper terminal bar 5.

The "bridging" current path consists of the copper terminal bar 6, the connecting point 10, the aluminum connector 11, the connecting point 12 (not visible here), the heat sink 7, the connecting point 17, the aluminum connector 18, the connecting points 19, 20, the fixed contact piece 3, the contact surface between the fixed contact piece 3 and the movable bridge 4, the movable bridge 4, the contact surface of the movable bridge 4 and the fixed contact piece 2, the connecting points 15, 16 and the copper terminal bar 5. There are consequently a number of connecting points within a current path. In the "bridging" current path, these are the connecting point 10 with the "tinned copper with aluminum" material pairing, the connecting points 12 (not visible here) and 17 with the "aluminum-aluminum" material pairing, the connecting points 19, 20 with the components "bare copper-aluminum" and the connecting points 15, 16 with the three components "bare copper-aluminum-tinned copper".

At present, it is the case that all of the connecting points may have excessive transfer resistances and that, with a number of successive heating processes, these transfer resistances change significantly, in that they generally become higher. Thus, for instance, at the connecting point 10 the initial transfer resistance is 20 µohms. After a number of heating processes, this increases by up to 10 times, and so the test current of 690 A leads to overheating of this connecting point. The connecting points 15, 16 and 19, 20 likewise show a clear increase in the transfer resistance, and so the movable bridge 4 heats up to excessive temperatures. The transfer resistances of the connecting points 17, 13 and 12 also do not remain stable and increase. All of these connection losses already lead to strong overheating of the power modules in bridged operation, that is to say when the thyristors are not in use, as a result of which the switching frequency is reduced drastically.

The heating up of the three power modules may in this case vary greatly, since all of the connecting points behave differently, and consequently produce different levels of heat loss.

Also in the "thyristor control" operating state, in which high starting currents occur, the inconsistent behavior of the connecting points 13 and 12 leads with regard to temperature to greatly differing and also high electrical losses at the connecting points. As a result, the power modules heat up unevenly in spite of symmetrical current loading. So the middle power module may be kept somewhat warmer than the two outer power modules by suitable modification of the cooling channels, and only the middle power module monitored by means of a temperature sensor. However, due to the undefined and unfavorable behavior of the connecting points, the rated current values planned for this size of device, of 470 A and 570 A, cannot be realized, since excessive temperatures must be expected in the power modules and the contact system.

This gives rise to the problem of improving all of the connecting points that occur in the current paths in such a way that the transfer resistance is low from the beginning, and also only increases up to a certain degree or remains virtually stable over the operational service life of the device.

It is known often to form connecting points with copper as a connecting component. In this case, both bare and tinned copper as well as combinations thereof are used. Connections in which both components include tinned copper are preferred, since the tinning provides protection from corrosion and, on account of the easy deformability of tin, surface roughnesses or surface defects can be compensated well. More contact points that can carry the current are thus created.

In the case of a further variant of a connection, the connecting components include silvered copper and aluminum. This connection is preferably used in the case of a changing loading that produces an appreciable change in temperature at the connecting parts. As a result, boundary layers that form in the case of this pairing keep being disrupted, and so the transfer resistance remains in an acceptable range. This combination is less suitable for continuous loading because of the boundary layer formation.

A further measure for producing a low-resistance connection between aluminum and copper is that of disks structured in a defined way and placed between the connecting components. These penetrate with their structure through the electrically interfering oxide film of the aluminum during screwing, whereby a low transfer resistance is achieved.

FIG. 2 shows such an Al elastic contact disk 21. The elastic contact disk 21 is preferably produced from aluminum and not only penetrates into the connecting components but is also deformed somewhat during the screwing process. In order that the bare aluminum partially exposed thereby is not oxidized, the elastic contact disk 21 is surface-tinned, and so the tin covers the regions of aluminum and protects them from oxidation by air. A precondition for the correct function is that forces are introduced evenly over the surface of the disk, and so, in the case of relatively thin connecting components, steel disks 4 mm thick have to be placed under the screw and/or nut.

Another possibility for connecting aluminum to copper are cupal disks. These include two disks connected to one another in a form-fitting manner, the one disk consisting of aluminum and the other consisting of copper. This construction is intended to avoid electrochemical processes at the contact surfaces. For a low transfer resistance on the aluminum side, the two aluminum surfaces must be freed of an oxide film before screwing. Generally, a contact grease is also applied in advance, in order that no oxygen or other constituents of air can reach the boundary surface and cause renewed oxidation or corrosion.

In the case of the connection of two aluminum components or an aluminum component to a copper component without the aid of something like the Al elastic contact disks or cupal disks, the removal of the oxide film from the aluminum component and the immediate subsequent greasing of the bare aluminum surface as a protection from oxidation and corrosion is a further possibility for producing an electrical connection. The removal of the oxide film may be performed for instance mechanically by brushing or rubbing off with emery paper.

SUMMARY

The inventors have discovered that disadvantages of the production methods for an electrical contacting interface with a low and stable electrical transfer resistance are in the cost-intensive and technically elaborate production.

Accordingly, at least one embodiment of the present invention realizes an electrical contacting interface with a low and stable electrical transfer resistance in an easy and low-cost way.

At least one embodiment of the invention is directed to an electrical contacting interface. Advantageous embodiments and developments, which can be used individually or in combination with one another, are the subject of the claims.

According to at least one embodiment of the invention an electrical contacting interface, with a low and stable electrical transfer resistance, comprises at least two contacting components, which interact for electrical contacting. In the case of one of the two contacting components, in the region of a contacting surface, there is formed a structuring that protrudes out of the plane of the contacting surface of the one contacting component, the structuring being deformed under the influence of a mechanical force and causing a corresponding deformation in the form of a depression in the opposite contacting component. The structure is protruding out of the plane being formed such that, even after the deformation caused in the opposite contacting component, the flat regions of the two contacting surfaces do not touch. Thus, the electrical current is forced to flow exclusively via the contact interface created during the deformation process, such that the current transfer surfaces are exactly localized.

BRIEF DESCRIPTION OF THE DRAWINGS

Further advantages and embodiments of the invention are explained in more detail below on the basis of an example embodiment and on the basis of the drawing, in which:

FIG. 10 shows an example embodiment of a first contacting component according to the invention, with a structure in the region of the contacting surface the structure protruding out of a plane.

FIG. 11 shows an example embodiment of a first contact component and a second contact component and a structure being deformable and causing a deformation in an opposite component.

FIG. 12 shows an example embodiment of a first contact component and a second contact component and showing that two contacting surfaces do not touch.

FIG. 13 shows an example embodiment of a first contacting component having a structure protruding out of a plane of a contact surface of the contact component.

FIG. 14 shows an example embodiment of a first contacting component having a structure protruding out of a plane of a contact surface of the contact component and the structure being deformable.

FIG. 15 shows and example embodiment of a second contact component and a structure being deformable causing a deformation in the opposite component.

FIG. 16 shows and example embodiment of a first contact component and a second contact component and showing that two contacting surfaces do not touch and shows a spring element.

DETAILED DESCRIPTION OF THE EXAMPLE EMBODIMENTS

Figure 1:
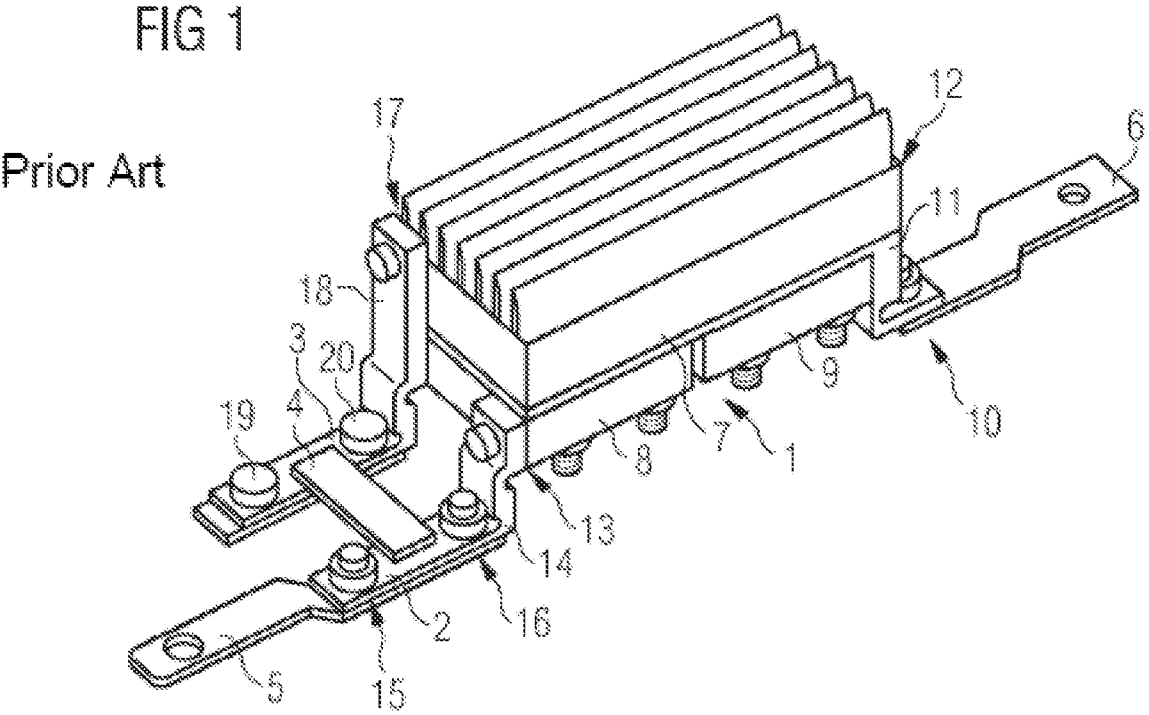
FIG. 1 shows in a perspective representation a power module known from the prior art, with a mechanical contact connection system as used for example in soft starting devices for operating asynchronous machines.

According to at least one embodiment of the invention an electrical contacting interface, with a low and stable electrical transfer resistance, comprises at least two contacting components, which interact for electrical contacting. In the case of one of the two contacting components, in the region of a contacting surface, there is formed a structuring that protrudes out of the plane of the contacting surface of the one contacting component, the structuring being deformed under the influence of a mechanical force and causing a corresponding deformation in the form of a depression in the opposite contacting component. The structure is protruding out of the plane being formed such that, even after the deformation caused in the opposite contacting component, the flat regions of the two contacting surfaces do not touch. Thus, the electrical current is forced to flow exclusively via the contact interface created during the deformation process, such that the current transfer surfaces are exactly localized.

A technical problem addressed is improved upon or even solved by one of the two contacting components being given in the region of the contact surfaces structuring that protrudes out of the plane of the contact surface. Furthermore, one of the two contacting components is provided with a surface tinning. Instead of the tinning, a thin copper film tinned on both sides may be placed between the connecting components.

According to at least one embodiment of the invention, aluminum is used as the material for the contacting components, since aluminum is less expensive than copper and also can be worked more easily. Furthermore, relatively complex profiles can be produced by the low-cost extrusion process. Moreover, aluminum has a much lower relative density than copper, and so the devices can be lighter. Furthermore, the greater elasticity of aluminum compared to copper contributes to allowing mechanical stresses that are produced for instance by the thermal expansion caused by heating or by production tolerances to be compensated better.

The contact interface according to at least one embodiment of the invention allows exactly defined electrical contact conditions that ensure stable and low transfer resistances to be produced between two or more contacting components. These low transfer resistances change only little under the influence of temperature changes as a result of stress due to changing loading. Mechanically relatively complex subassemblies with a multiplicity of electrical contact points can also be realized.

The measures proposed here allow the ohmic losses in the "bridging" current path of about 400 W, which for a large part include electrical losses at the contact points with flat contact surfaces, to be lowered to about one third. These measures make it possible in the first place that the rated device currents of 470 A and 570 A can be realized in this form of construction. The considerable reduction of the ohmic losses at the contact points allows the ohmic power loss produced per unit of volume to be significantly reduced, and consequently the device dimensions to be made correspondingly smaller. The connecting components can be produced at low cost by the extrusion process. Lightweight and low-cost aluminum, which can be produced at particularly low cost and easily by the extrusion process, can be used as the contact material.

Alternatively, one contact surface or else both contact surfaces may be provided with a suitable structure, protruding out of the contact plane, by an embossing operation. To avoid environmental influences, before screwing, flat contact surfaces are often coated with a contact grease, which is intended to avoid oxidation, and consequently impairment of the transfer resistance. When the structures presented here are used for creating exactly defined contact surfaces or current transfer surfaces, greasing is not necessary, since the high pressing pressure provides an airtight seal of the connecting points. This applies in particular whenever one of the two contacting components is provided with a surface tinning, whereby production is made easier. Other aids, such as for example an Al elastic contact disk, are not required, and nor are they available in the appropriate size with a small diameter.

It is not only in the case of contacting components of aluminum that a structuring reduces the transfer resistances, but also whenever unproblematic connecting components, such as tinned copper conductors, are to be connected. The soft tin surface is conducive to the creation of current transfer points, since it can adapt itself better to surface unevennesses. As a result, low transfer resistances are also achieved in the case of flat contact surfaces. With the structuring measure according to the invention, here too the transfer resistances can be additionally reduced by about 10-200.

A starting point for at least one embodiment of the invention was the thought that, in the case of actual, flat contact surfaces, the current transfer only occurs at a few so-called contact points, which are obtained more or less randomly under the influence of the pressing force and may also change their location or form at different points under heating, as a result of the mechanical changes in length of the connecting components which then occur. Usually, the contact surface that is theoretically possible is so large that, with the pressing forces that can be applied by means of a screwing operation, too low a pressure is produced for defined contact conditions, and consequently current transfer conditions.

The structuring according to at least one embodiment of the invention of one of the two contact surfaces uses only about one hundredth of the contact surface that is theoretically available for the current transfer. Since the pressing force of the screwing operation can only act on the contact surface predetermined by the structuring, very high pressures are produced there. This creates exactly defined contact conditions with low and stable transfer resistances, which also only change little under the influence of temperature changes as a result of stress due to changing loading.

The tinning of the connecting component that is provided with a structuring in the contact region allows the transfer resistances to be reduced somewhat once again.

The deformation produces an increase in the surface area, and consequently bare regions of aluminum both in the region of the structuring and in the region of the depression that is created in the opposite contacting component. The soft tin molds itself to the newly created contact surfaces and protects the bare regions of aluminum from oxidation. This ensures the stability of the transfer resistance of the connection.

A further important point is the preservation of the pressing force, and consequently of the pressing pressure, on the contact surfaces of the structure during operation of the device. If the connection is made by means of screwing, there must be a correspondingly long, mechanically unstressed part of the overall length of the screw, in order that it can develop a certain spring effect in order to be able to compensate for thermomechanical changes in length or else subsequent settling processes of the contact structure.

In addition or else as an alternative, if both connecting components are thin, spring elements 33 such as spring washers or else cylindrical sleeves may be used in order to be able to use longer screws 32. In the case of thin connecting components, thrust washers must be additionally used on the outer sides of the connecting components in order to achieve uniform application of force to the contact surfaces of the structure.

The electrical contacting interface according to at least one embodiment of the invention that is presented here, with a low and stable electrical transfer resistance, provides compact and low-cost devices.

In a particularly advantageous refinement of the invention, it may be provided that one of the two contacting components has a surface tinning.

A development of the concept according to at least one embodiment of the invention may be that the contacting component is produced from an extruded profile of aluminum.

A particularly advantageous development of this concept may be that the contacting component is electroplated with tin.

A further embodiment of this concept according to at least one embodiment of the invention may provide that a copper film tinned on both sides is formed between the two contacting components.

In a particularly advantageous refinement of at least one embodiment of the invention, it may be provided that the structuring takes the form of webs.

A development of this concept according to at least one embodiment of the invention may be that the structuring takes the form of projections.

The electrical contacting interface according to at least one embodiment of the invention with a low and stable electrical transfer resistance preferably comprises two contacting components, the one having a structuring in the region of the contacting surface and the second contacting component having a flat surface before the contacting or forming of the interface. The structuring may for example take the form of webs with a trapezoidal profile or the form of a circular periphery protruding out of the surface, which is produced by hammering in a depression, for instance with a center punch and a hammer. These depressions with a circular periphery are preferably arranged around a through-hole for an electrical connection.

In FIG. 1, a power module 1 with a mechanical contact connection system, as used for example in asynchronous machines, is shown. These asynchronous machines are designed for operation in three-phase power supply systems and contain three of these subassemblies shown in FIG. 1. The connection of the devices to the three-phase system takes place by way of the respective terminal bars 5 and 6.

In the power module 1, two thyristors are arranged anti-parallel. With the thyristors, the current is controlled by suitable activation in order to obtain soft starting or braking of the ASM. The electrical losses thereby occurring in the thyristors are carried away from them by aluminum heat sinks 7, 8, 9, to avoid them overheating. The two thyristors are located between the upper heat sink 7 and the two lower heat sinks 8, 9 and cannot be seen here.

Figure 2:
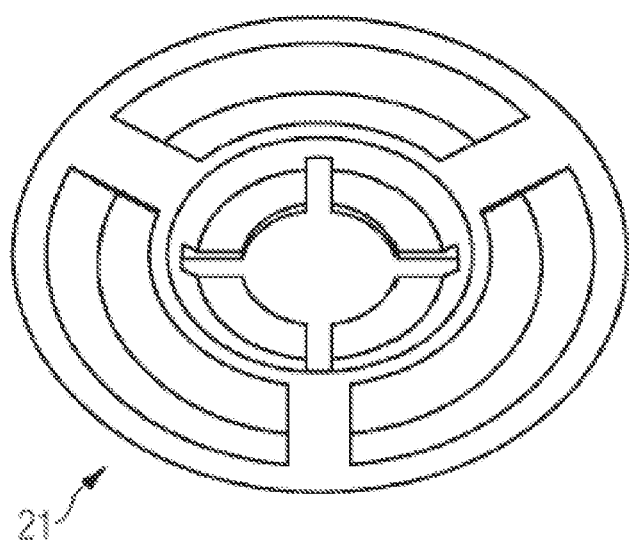
FIG. 2 shows in a perspective representation an Al elastic contact disk known from the prior art.

FIG. 2 shows an Al elastic contact disk 21 known from the prior art. The Al elastic contact disk 21 is preferably produced from aluminum and not only penetrates into the connecting components but is also deformed somewhat during the screwing process. In order that the bare aluminum partially exposed thereby is not oxidized, the elastic contact disk 21 is surface-tinned, and so the tin covers the regions of aluminum and protects them from oxidation by air.

Figure 3:
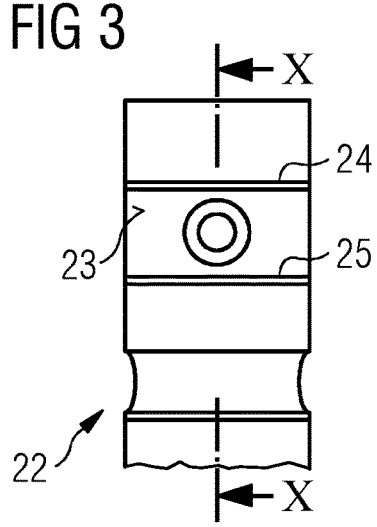
FIG. 3 shows in a plan view a first example embodiment of a first contacting component according to the invention, with a structuring in the region of the contacting surface, before contacting with a second contacting component.

FIG. 3 shows a first example embodiment of a first contacting component 22 according to the invention, with a structuring in the region of a contacting surface 23, before contacting with a second contacting component. The contacting component 22 is preferably an aluminum connector. The structuring is preferably formed by two webs 24, 25 with a trapezoidal profile. The height is about 0.2 mm; the width varies from about 0.5 mm to about 1 mm at the base of the trapezoid. The web length is about 15 mm. Since the aluminum connector is produced from an extruded profile, webs 24, 25 can be produced very easily and cost-neutrally. The connector is preferably electroplated with tin.

Figure 4:
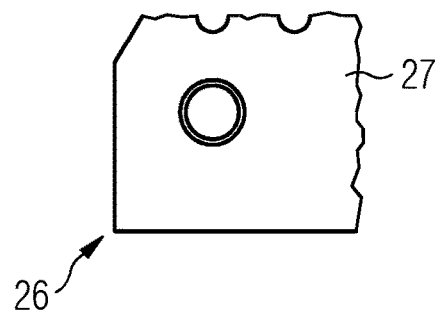
FIG. 4 shows in a plan view a second contacting component according to an embodiment of the invention, with a flat contact surface, before contacting with the first contacting component.

FIG. 4 shows a second contacting component 26 according to an embodiment of the invention, with a flat surface 27, which forms the contacting surface 23 after contacting with the first contacting component 22, before contacting with the first contacting component 22. If FIG. 1 is referred to, FIG. 4 shows the opposite, flat contact surface 27 on the aluminum heat sink (FIG. 1). The screwing is preferably performed with a screw M6 into the heat sink 7. The tightening torque is in this case about 10 Nm. This produces a force acting in the longitudinal axis of the screw of about 3-5 kN, which presses the webs 24, 25 of the connector onto the heat sink 7. The webs 24, 25 are thereby deformed.

Figure 5:
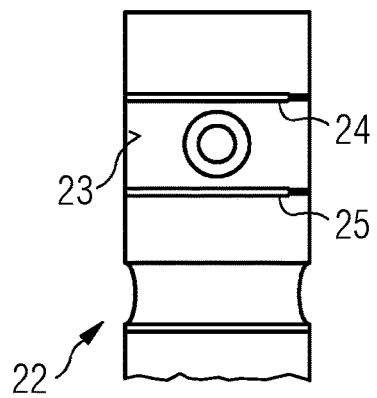
FIG. 5 shows in a plan view the first contacting component according to an embodiment of the invention, with a structuring in the region of the contacting surface, after contacting with a second contacting component.
Figure 6:
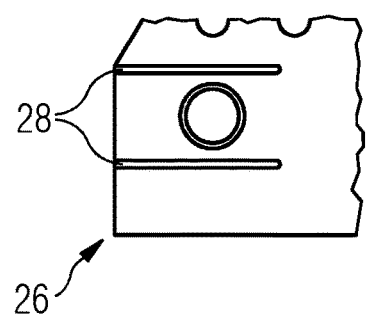
FIG. 6 shows in a plan view the second contacting component according to an embodiment of the invention, after contacting with the first contacting component.

In FIG. 5, the first contacting component 22, with a structuring in the region of the contacting surface 23, is shown after contacting with a second contacting component 26. The screwing has the effect that the webs 24, 25 are deformed. The deformation of the webs 24, 25 causes an increase in the surface area, and consequently in the current transfer surface. The tinning prevents bare aluminum from being present at the surface here. The pressing force has the effect that the webs 24, 25 produce corresponding depressions 28 in the heat sink 7, which is accompanied by an increase in the surface area in the region of the depressions (FIG. 6). As a result, the oxide film is interrupted and the tinned webs 24, 25 come partially into contact with bare aluminum.

As a result of the softness of the tin layer, the surfaces of the depressions are covered by the tin layer, and consequently so too are the areas of bare aluminum, and so they can no longer oxidize. A tin layer thickness of 5-10 µm is already enough for this purpose. The height of the webs 24, 25 of the connector is chosen such that, even after their deformation and after the creation of the depressions 28 in the heat sink 7, the flat surfaces of the two contacting surfaces 23 do not touch, and the current is forced to flow via the contact surfaces 28 created during the deformation. The contact surface of the two deformed webs 24, 25 is approximately 2×15 mm×0.9 mm=27 mm2. The M6 screw produces a force acting in the longitudinal direction of the screw of about 3000 . . . 5000 N, which is transferred to the contact surface. The pressure on these current transfer surfaces is consequently approximately p=3000 N/27 mm2 . . . 5000 N/27 mm2=111 N/mm2 . . . 185 N/mm2.

The theoretical contact surface, that is to say the surface on which the two connecting partners can theoretically touch when no structure is present, is about 20 mm×15 mm=3000 mm2, and is consequently about 100 times greater than the contact surface actually used for current conduction via the surface of the webs. The current transfer consequently takes place over a much smaller surface area than in the case of flat contact surfaces and ideal contact conditions.

In spite of the only small contact surface, defined by the structuring, that is involved in the current conduction, the transfer resistances of the connecting point are very low. They are in the range of about 5-10 µohms, consequently less by a factor of 2-20 than the transfer resistances without the structuring. In particular, when there is a suitable structuring, the transfer resistances have only little variation.

The positive influence of the structuring is also found in the fact that the transfer resistances only increase a little under changing and continuous loading, to about 10-20 µohms, and then remain stable. The stable state is reached after about 3000-5000 temperature cycles, with a temperature swing of about 80 K at the connecting point, taken from a starting temperature of T start=40° C. By contrast, by means of the structuring of one of the two contact surfaces that is shown here by way of example, exactly defined contact conditions are produced, with which low and stable transfer resistances can be realized. It was consequently possible to lower the ohmic losses in the "bridging" current path from about 400 W to about 130 . . . 150 W. The rated device currents of 470 A and 570 A can consequently be implemented in this form of construction.

FIG. 6 shows the second contacting component 26, after contacting with the first contacting component 22, the screwing operation having formed depressions 28 in the aluminum heat sink 7.

Figure 7:
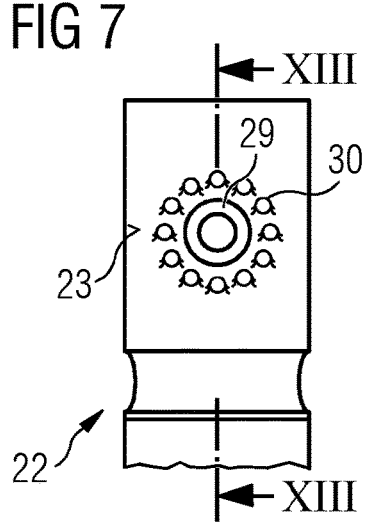
FIG. 7 shows in a plan view a second example embodiment of the first contacting component according to the invention, with a second structuring in the region of the contacting surface, before contacting.

In FIG. 7, a second example embodiment of a first contacting component 22 according to the invention is shown, with a second structuring in the region of the contacting point 23, before contacting. Around a through-hole 29 for a screwing operation, projections, in particular crater-shaped projections 30, have been introduced, preferably with a center punch.

Figure 8:
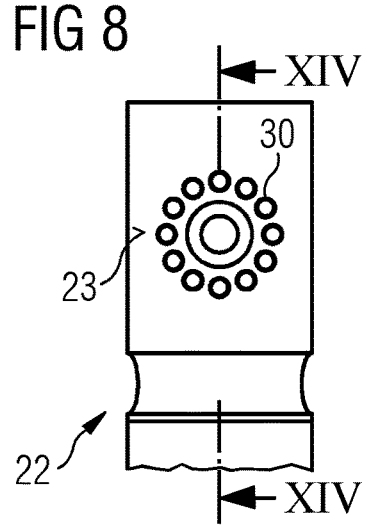
FIG. 8 shows in a plan view the first contacting component according to an embodiment of the invention as shown in FIG. 7, with a second structuring in the region of the contacting surface, after contacting with a second contacting component.

FIG. 8 shows the first contacting component 22 as shown in FIG. 7, with a second structuring in the region of the contacting surface 23, after contacting with a second contacting component. The screwing has the effect that the peripheries of the craters are pressed flat.

Figure 9:
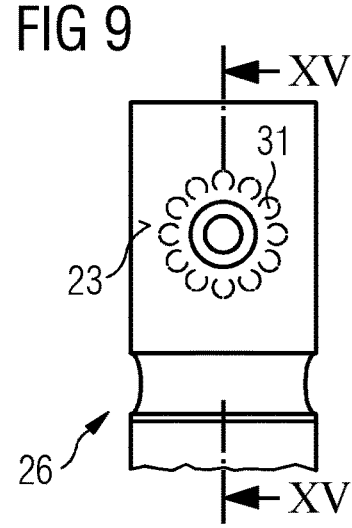
FIG. 9 shows in a plan view the second contacting component according to an embodiment of the invention, after contacting with the first contacting component as shown in FIG. 8.

In FIG. 9, the second contacting component 26 according to the invention is shown, after contacting with the first contacting component 22 as shown in FIG. 8. In this second contacting component 26, positioned opposite the first contacting component 22, the peripheries of the craters produce corresponding depressions 31, comparable to the first example embodiment.

Instead of the tinning of one of the two contacting components 22, 26, a copper film that is tinned on both sides may be placed between the contacting surfaces 23. This likewise has the effect of providing a covering, and consequently protection, for the surface of the deformed contact structure and the surface of the depression 31 created in the opposite connecting component.

If the contacting components include aluminum and copper, the structure may also be provided in the copper. On account of the greater mechanical strength of copper, the screwed connection undergoes rather less settling.

More than two contacting components may also be screwed together, i.e. stacked constructions are possible. The contact surfaces of the individual connecting components must be provided with structures in such a way that, if there are two opposite contact surfaces, at least one structure is always effective.

The electrical contacting interface according to the invention with a low and stable electrical transfer resistance is distinguished by its easy and low-cost production process.

FIG. 10 shows an example embodiment of a first contacting component 22 according to the invention, with a structure 24, 25 in the region of the contacting surface 23, the structure protruding out of a plane.

FIG. 11 shows an example embodiment of a first contact component 22 and a second contact component 26 and a structure 24, 25 being deformable and causing a deformation in an opposite component.

FIG. 12 shows an example embodiment of a first contact component 22 and a second contact component 26 and showing that two contacting surfaces do not touch.

FIG. 13 shows an example embodiment of a first contacting component 22 having a structure 30 protruding out of a plane of a contact surface 23 of the contact component.

FIG. 14 shows an example embodiment of a first contacting component 22 having a structure 30 protruding out of a plane of a contact surface 23 of the contact component and the structure being deformable.

FIG. 15 shows and example embodiment of a second contact component 26 and a structure 31 being deformable causing a deformation in the opposite component.

FIG. 16 shows and example embodiment of a first contact component 22 and a second contact component 26 and showing that two contacting surfaces do not touch and shows a spring element 33.

LIST OF DESIGNATIONS

1 Power module
2 Fixed contact piece
3 Fixed contact piece
4 Bridge
5 Terminal bar
6 Terminal bar
7 Heat sink
8 Heat sink
9 Heat sink 10 Connecting point
11 Aluminum connector
12 Connecting point
13 Connecting point
14 Aluminum connector
15 Connecting point
16 Connecting point
17 Connecting point
18 Aluminum connector
19 Connecting point
20 Connecting point
21 Al elastic contact disk
22 Contacting component
23 Contacting surface
24 Webs
25 Webs
26 Contacting component
27 Surface
28 Depression
29 Through-hole
30 Crater-shaped projections
31 Depression

The invention claimed is:

1. An electrical connector having a contacting interface with a low and stable electrical transfer resistance, comprising:
at least two contacting components, to interact for electrical contacting, each of the at least two contacting components have a contacting surface, and in a region of a contacting surface of one of the at least two contacting components a structure is formed protruding out of a plane of the contacting surface of the one contacting component, the structure being deformable under influence of only a mechanical force during connection of the at least two contacting components to one another and, upon deformation, causing a corresponding deformation, in a form of a depression, in the contacting surface of an opposite contacting component of the at least two contact components, the structure protruding out of the plane being formed such that, even after the deformation is caused in the opposite contacting component, flat regions of the contacting surfaces of the at least two contacting components do not touch, and electrical current is forced to flow exclusively via the protruding contacting surface created during the deformation process, such that current transfer surfaces are exactly localized;
a through hole in an area within the structure; and
a spring element in pressing contact with at least one of the at least two contacting components and configured to apply and preserve a pressing force and a pressing pressure on contact surfaces of the at least two contacting components during operation of the electrical contacting interface, wherein the structure takes a form of crater-shaped projections around the through hole.

2. The electrical connector of claim 1, wherein one contact surface of the at least two contacting components including a surface tinning.

3. The electrical connector of claim 2, wherein at least one contacting component of the at least two contacting components, is produced from an extruded profile of aluminum.

4. The electrical connector of claim 2, wherein at least one contacting component of the at least two contacting components, is electroplated with tin.

5. The electrical connector of claim 2, wherein a copper film tinned on both sides is formed between two of the at least two contacting components.

6. The electrical connector of claim 1, wherein at least one contacting component of the at least two contacting components, is produced from an extruded profile of aluminum.

7. The electrical connector of claim 1, wherein at least one contacting component of the at least two contacting components, is electroplated with tin.

8. The electrical connector of claim 1, wherein a copper film tinned on both sides is formed between two of the at least two contacting components.

9. The electrical connector of claim 1, wherein the structure takes a form of webs.

10. The electrical connector of claim 1, further comprising a screw passing through one of the at least two contacting components and into the other of the at least two contacting components.

11. The electrical connector of claim 1, wherein the electrical transfer resistance is 5-10 ohms.

12. The electrical connector of claim 1, wherein the electrical contacting interface is an electrical connector.

* * * * *